United States Patent [19]

Nakano

[11] Patent Number: 5,483,404
[45] Date of Patent: Jan. 9, 1996

[54] SEMICONDUCTOR INTEGRATED CIRCUIT

[75] Inventor: Toshiya Nakano, Itami, Japan

[73] Assignee: Mitsubishi Denki Kabushiki Kaisha, Tokyo, Japan

[21] Appl. No.: 402,719

[22] Filed: Mar. 13, 1995

[30] Foreign Application Priority Data

Sep. 9, 1994 [JP] Japan .................................. 6-216226

[51] Int. Cl.⁶ ..................................................... H02H 7/10
[52] U.S. Cl. ................... 361/18; 361/42; 361/86
[58] Field of Search ................... 361/42, 86, 88, 361/18

[56] References Cited

U.S. PATENT DOCUMENTS

| | | | |
|---|---|---|---|
| 4,649,454 | 3/1987 | Winterton | 361/42 |
| 4,868,702 | 3/1989 | Hertz et al. | 361/42 |

*Primary Examiner*—Todd DeBoer
*Attorney, Agent, or Firm*—Leydig, Voit & Mayer

[57] ABSTRACT

A semiconductor integrated circuit allows no through-current to flow to voltage-driven-type power control devices of an external circuit even when the grounding terminals are opened, thereby protecting the devices from breakdown. The semiconductor integrated circuit includes input terminals, a power terminal connected to a drive power source of power MOSFETs, control output terminals connected to control terminals of the power MOSFETs, a grounding terminal divided into at least two grounding terminals that are connected to each other in the exterior, a control logic section, a pre-driver section which outputs a drive control signal to the control terminals of the power MOSFETs and which causes a consumption current to flow to the second grounding terminal, and a consumption current detecting section including a first NPN transistor whose base is connected to the first grounding terminal and whose emitter is connected to the second grounding terminal and a second NPN transistor whose base is connected to the second grounding terminal and whose emitter is connected to the first grounding terminal, and detecting a flow of consumption current between the first and second grounding terminals and clamping the electric potential of the grounding terminal to a level not higher than the drive control potential of the power MOSFETs.

11 Claims, 5 Drawing Sheets

SEMICONDUCTOR INTEGRATED CIRCUIT

BACKGROUND OF THE INVENTION

1. Field of the Invention

This invention relates to a semiconductor integrated circuit for driving a voltage-driven-type power control device, such as a power MOSFET or IGBT (insulated gate bipolar transistor) and, in particular, to a semiconductor integrated circuit for preventing breakdown of a voltage-driven-type power control device when the grounding terminal is opened.

2. Description of the Related Art

FIG. 6 is a circuit diagram showing an example of a conventional semiconductor integrated circuit including a peripheral circuit.

In FIG. 6, reference designators Q1 through Q4 indicate power MOSFETs used as voltage-driven-type power control devices constituting an H-bridge for performing reversible-operation control of a motor M. Reference designators T1 and T2 indicate transistors, reference designators D1 indicates a diode, and reference designators I1 indicates a current source. The transistors T1 and T2, the diode D1, and the current source I1 are adapted to drive (hereinafter the term "pre-drive" will be used) the power MOSFET Q1 and constitute a pre-driver block 1. Similar pre-driver blocks 2 through 4 are respectively assigned to the other power MOSFETs Q2 through Q4 constituting the H-bridge. A boosting power Vcp (which is approximately 2 Vcc) is supplied to the control terminal side of the power MOSFETs Q1 and Q2, which are on the high-power side ("high" side), and a power Vcc is supplied to the control terminal side of the power MOSFETs Q3 ad Q4, which are on the low-power side ("low" side).

Reference designators R1 through R4 indicate resistors. That section of the drawing which is on the left-hand side of the chain line shows a pre-driver section constituting a part of the semiconductor integrated circuit, and that section of the drawing which is on the right-hand side of the chain line shows the external circuit. Reference designators G1 through G4 indicate control output terminals of the semiconductor integrated circuit which are connected to the control terminals of the power MOSFETs Q1 through Q4 and adapted to output drive control signals. Symbol P indicates a power terminal connected to the drive power source Vcc for the MOSFETs Q1 through Q4. Symbol GND indicates a grounding terminal of the semiconductor integrated circuit. Symbol PGND indicates a grounding terminal of the external circuit. Although in the following the construction of the power MOSFETs, constituting the peripheral circuit, will be described with reference to a case in which they constitute an H-bridge, the following description also applies to a half bridge or a three-phase full bridge.

When this semiconductor integrated circuit, constructed as described above, is applied, for example, to the control of a motor M of a motor-operated power steering in an automobile, the output to the control output terminals G1 through G4 of the semiconductor integrated circuit is controlled, for example, such that the motor M is caused to rotate in the normal direction by turning on the power MOSFETs Q1 and Q4 of the peripheral circuit and turning off the power MOSFETs Q2 and Q3 thereof; that the motor M is caused to rotate in the reverse direction by turning on the power MOSFETs Q2 and Q3 and turning off the power MOSFETs Q1 and Q4; that the ends of the load formed by the motor M is short-circuited to cause, for example, a coil to consume accumulated energy to thereby effect electromagnetic braking by turning on the power MOSFETs Q3 and Q4 and turning off the power MOSFETs Q1 and Q2; and that the motor M is stopped by turning off all the power MOSFETs Q1 through Q4.

When a semiconductor integrated circuit, which is generally mounted on a printed circuit board or the like, is put to use where a high level of reliability is required as in the case, for example, of an automobile, an evaluation called FMEA (failure mode effect analysis) is sometimes performed to determine what kind of phenomenon occurs to the system when the terminal pins of the semiconductor circuit are opened. In the case of the semiconductor integrated circuit shown in FIG. 6, opening the pin of the grounding terminal GND causes all the power MOSFETs Q1 through Q4 to be turned ON, with the result that a through-current from the power source Vcc flows, for example, via the route: Vcc→Q1→Q3→PGND and the route: Vcc→Q2→Q4→PGND, resulting in breakdown of the power MOSFETs Q1 through Q4.

When in a system the pins of grounding terminals GND and PGND are both opened in a connector section of a unit or the like, no through-current as mentioned above will flow. However, if the pin of only the grounding terminal GND of a semiconductor integrated circuit is open due to defective soldering or the like, the power MOSFETs Q1 through Q4 suffer breakdown, which can lead to a fire at the worst.

Regarding the mechanism in which, when the pin of the grounding terminal GND of a semiconductor circuit is opened, all the power MOSFETs are turned ON, the following may be assumed:

For example, in the case of a bi-polar integrated circuit, the NPN transistor has a structure as shown in FIG. 7, in which a parasitic diode $D_{SUB}$ exists between the collector (C) and the P-substrate (The P-substrate is normally short-circuited to a grounding terminal GND).

Thus, when the collector (C)—base (B) of the NPN transistor shown in FIG. 7 is short-circuited and used as the diode D1 shown in FIG. 6, an equivalent circuit is obtained as shown in FIG. 8, and, when the grounding terminal GND shown in FIG. 6 is open, a consumption current (hereinafter referred to as "Icc") of the semiconductor integrated circuit flows to the gate of the power MOSFET Q1, for example, through the route: grounding terminal GND→parasitic diode $D_{SUB}$→control output terminal G1→resistor R1→power MOSFET Q1, with the result that the power MOSFET Q1 is turned ON. Similarly, the power MOSFETs Q2 through Q4 are also turned ON. The electric potential of the grounding terminal GND at this time is raised to a level close to that of the power source Vcc.

Further, even if, as shown in FIG. 9, the diode D1 shown in FIG. 6 is formed of a PNP transistor, and the parasitic diode $D_{SUB}$ is not connected to the control output terminal G1, there remains the following route for the consumption current Icc: grounding terminal GND→parasitic diode of the transistor T2→base of the transistor T1→emitter of the transistor T1→control output terminal G1→resistor R1→power MOSFET Q1, due to the presence of a parasitic diode in the collector of the transistor T2 shown in FIG. 6, with the result that the power MOSFETs Q1 through Q4 are turned ON.

Summary of the Invention

It is accordingly an object of this invention to provide a semiconductor integrated circuit which allows no through-current to flow to the voltage-driven-type power control devices of an external circuit even when the grounding terminal is open to thereby protect them from breakdown.

In order to achieve the above object, there is provided a semiconductor integrated circuit comprising input terminals to which an operation command from the outside is input; a power terminal connected to a drive power source of voltage-driven-type power control devices constituting an object of control; control output terminals connected to control terminals of the voltage-driven-type power control devices and adapted to output drive control signals for drive-controlling the voltage-driven-type power control devices; a grounding terminal divided into at least two (first and second) grounding terminals and connected to each other in the exterior; control means composed of a control logic section which outputs a control command corresponding to the operation command input from the outside through the input terminals and consisting of bit information and which causes a consumption current to flow to the first grounding terminal, and a pre-driver section which outputs a drive control signal to the control terminals of the voltage-driven-type power control devices and which causes a consumption current to flow to the second grounding terminal; and a consumption current detecting section which detects a flow of consumption current between the first and second grounding terminals and which clamps the electric potential of the grounding terminals to a level not higher than the drive control potential of the voltage-driven-type power control devices. With this arrangement, even when the grounding terminals are opened, no through-current is allowed to flow to the voltage-driven-type power control devices of the external circuit, thereby protecting them from breakdown.

The consumption current detecting section may comprise a first NPN transistor whose base is connected to the first grounding terminal and whose emitter is connected to the second grounding terminal and a second NPN transistor whose base is connected to %he second grounding terminal and whose emitter is connected to the first grounding terminal, wherein collector signals of the first and second NPN transistors are used as detection signals, thereby preventing a substantial increase in chip size due to an increase in the number of devices solely by adding two transistors.

Further, the consumption current detecting section may comprise a first diode whose anode is connected to the first grounding terminal and whose cathode is connected to the second grounding terminal; a second diode whose anode is connected to the second grounding terminal and whose cathode is connected to the first grounding terminal; a first comparator for comparing the forward voltage of the first diode with a reference voltage; and a second comparator for comparing the forward voltage of the second diode with a reference voltage, wherein the comparison outputs of the first and second comparators are output as detection signals. In having this arrangement, even if, when the grounding terminal pin is not open, a difference in electric potential is generated between the first and second grounding terminals due to the influence of noises or the like, the voltage-driven-type power control devices of the external circuit are prevented from being erroneously operated through enhancement of detection sensitivity by removing the influence of noises or the like through appropriate setting of the above-mentioned reference voltage. Further, the respective reference voltages of the comparators can be set separately and independently, thereby making it possible to adjust the detection sensitivity.

Further, by means of the above-mentioned control logic section, a control command for OFF-controlling the above drive control signals on the basis of the detection signals from the consumption signal detecting section, is output to the above-mentioned pre-driver section, thereby preventing a runaway of the voltage-driven-type power control devices of the external circuit to thereby secure safety.

Further, by means of the above-mentioned control logic section, an abnormal state signal indicating that one of the first and second divisional grounding terminals is open, is transmitted to the exterior on the basis of the detection signals from the consumption signal detecting section, thereby making it possible to perform self-diagnosis.

DESCRIPTION OF THE PREFERRED EMBODIMENTS

Embodiments of the present invention will now be described with reference to the drawings.

First Embodiment

Figure 1:
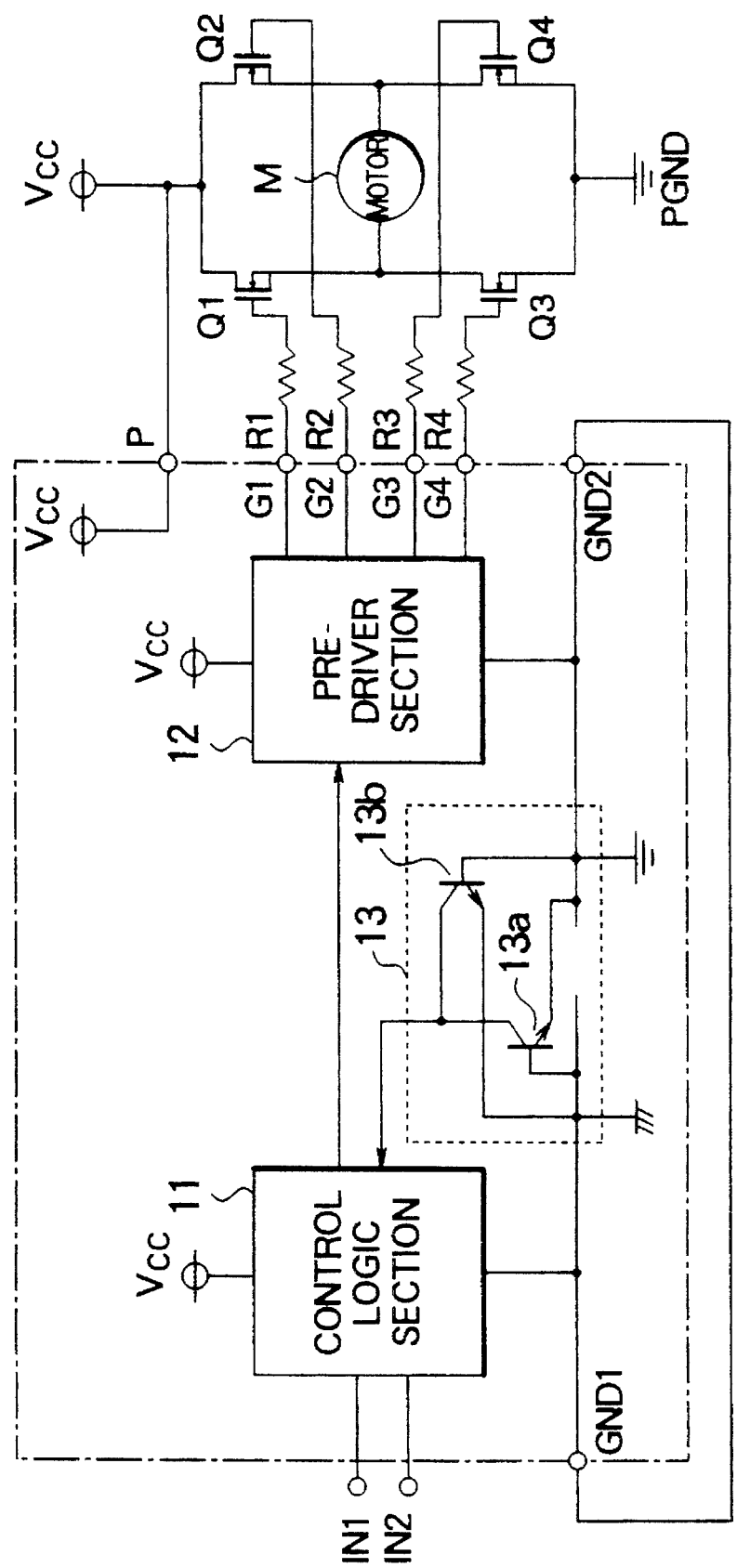
FIG. 1 is a block diagram showing a semiconductor integrated circuit according to a first embodiment of the present invention and a peripheral circuit thereof.

FIG. 1 is a block diagram showing a semiconductor integrated circuit according to the first embodiment of the present invention, including a peripheral circuit.

In FIG. 1, a semiconductor integrated circuit is divided into two function blocks a control logic section 11 and a pre-driver section 12 having a built-in booster circuit. The control logic section 11 is supplied with power from a power source Vcc, and outputs a control command to the pre-driver section 12 in response to a 2-bit operation command from input terminals IN1 and IN2. The pre-driver section 12 has control output terminals respectively connected to gates which constitutes the control terminals of power MOSFETs Q1 through Q4 serving as voltage-driven-type power control devices, which constitutes an H-bridge for reversible rotation control of a motor M. The pre-driver section 12 outputs drive control signals for pre-driving the power MOSFETs Q1 through Q4 of the external circuit on the basis of a control command from the control logic section 11.

Reference designators GND1 and GND2 indicate first and second grounding terminals that are obtained by dividing the grounding terminal of a semiconductor integrated circuit into two divisional grounding terminals. In the control logic section 11, a consumption current flows from the power source Vcc to the first grounding terminal GND1, and, in the pre-driver section 12, a consumption current flows from the power source Vcc to the second grounding terminal GND2. That is, a consumption current from the power source to the grounding terminal is constantly flowing in one block. The pins of the grounding terminals GND1 and GND2 are in short-circuit connection with each other in the exterior of the semiconductor integrated circuit.

Numeral 13 indicates a consumption current detecting section for detecting a consumption current flow between the first and second grounding terminals GND1 and GND2 and for clamping the electric potential of the grounding terminals to a level not higher than the drive control potential of the power MOSFETs Q1 through Q4. Even when the pins of the grounding terminals are opened, the consumption current detecting section allows no through-current to flow to the MOSFETs Q1 through Q4 of the external circuit and thereby protects them from breakdown.

The consumption current detecting circuit 13 comprises a first NPN transistor 13a whose base is connected to the first grounding terminal GND1 and whose emitter is connected to the second grounding terminal GND2, and a second NPN transistor 13b whose base is connected to the second grounding terminal GND2 and whose emitter is connected to the first grounding terminal GND1. Even when either the first grounding terminal GND1 or the second grounding terminal GND2 is opened, the electric potential of these grounding terminals does not become higher than the base-emitter voltage VBE (which is approximately 0.7 V) of the transistor, so that the power MOSFETs Q1 through Q4 of the external circuit are not turned ON. That is, the electric potential of the grounding terminals is clamped to a level not higher than the drive control potential of the power MOSFETs Q1 through Q4 of the external circuit.

Collector signals of the first and second NPN transistors are output to the control logic section 11 as detection signals. When the collector signal of either the first or second NPN transistor 13a or 13b is input as a detection signal, the control logic section 11 outputs a control command to turn OFF all the power MOSFETs Q1 through Q4 to the pre-driver section 12. By means of the control logic section 11, the drive control signals to the power MOSFETs Q1 through Q4 of the external circuit are OFF-controlled, whereby a runaway of the power MOSFETs Q1 through Q4 is prevented to secure safety.

Further, in the embodiment of FIG. 1, reference designators R1 through R4 indicate resistors; reference designators G1 through G4 indicate control output terminals of the semiconductor integrated circuit that are connected to the control terminals of the power MOSFETs Q1 through Q4 and adapted to output drive control signals; symbol P indicates a power terminal of the semiconductor integrated circuit which terminal is connected to the drive power source Vcc of the power MOSFETs Q1 through Q4; reference designators GND1 and GND2 indicate the first and second grounding terminals of the semiconductor integrated circuit; symbol PGND indicates the grounding terminal of the external circuit; and reference designators IN1 and IN2 indicate input terminals of the semiconductor integrated circuit.

The control logic section 11 outputs a control command to the pre-driver section 12 in response to a 2-bit operation command from the input terminals IN1 and IN2. To control the operation of the motor M, the 2-bit operation command from the input terminals IN1 and IN2 may be determined as follows: "H, L" for normal rotation; "L, H" for reverse rotation; "H, H" for braking; and "L, L" for stopping. When this 2-bit operation command is input to the control logic section 11, a control command corresponding to this operation command is output to the pre-driver section 12, and, on the basis of this control command, the pre-driver section 12 controls the outputs from the control output terminals G1 through G4 of the semiconductor integrated circuit, thereby pre-driving the power MOSFETs Q1 through Q4 of the external circuit.

That is, the pre-driver section 12 controls the motor M for normal rotation by turning on, for example, the power MOSFETs Q1 and Q4 of the external circuit and turning off the power MOSFETs Q2 and Q3 thereof; for reverse rotation by turning on the power MOSFETs Q2 and Q3 and turning off the power MOSFETs Q1 and Q4; for electromagnetic braking by turning on the power MOSFETs Q3 and Q4 and turning oil the power MOSFETs Q1 and Q2 to short-circuit both ends of the load formed by the motor M to thereby cause, for example, a coil to consume accumulated energy; and, for stopping, by turning off all the power MOSFETs Q1 through Q4.

In the embodiment shown in FIG. 1, the semiconductor integrated circuit is divided, in terms of function, into the control logic section 11 and the pre-driver section 12, and, in correspondence with this division, the grounding terminal is also divided into the first and second grounding terminals GND1 and GND2, with the first and second grounding terminals being in short-circuit connection with each other in the exterior of the semiconductor integrated circuit. What is important in dividing the integrated circuit into functional blocks is that, in each divisional functional block, a consumption current should constantly flow from the power source Vcc to the grounding terminal GND1 or GND2.

The reason for this arrangement is to unfailingly turn on either the transistor 13a or 13b of the consumption current detecting section 13 whenever either the grounding terminal GND1 or GND2 becomes open.

Generally speaking, in a P-substrate, short-circuiting to the grounding terminal is often effected within the chip in order to prevent the electric potential from floating. In the first embodiment, however, only one of the first and second grounding terminals GND1 and GND2 can be connected to the P-substrate. This is due to the fact that, when in a P-substrate the grounding terminal GND1 or GND2 is short-circuited, the electric potential of the open grounding terminal does not float even if either the grounding terminal GND1 or GND2 becomes open.

For example, when the first grounding terminal GND1 is opened, the consumption current $Icc_1$ of the control logic section 11 flows from the base to the emitter of the NPN transistor 13a, that is, to the second grounding terminal GND2, thereby turning on the NPN transistor 13a. The collector signal of this NPN transistor 13a is output to the control logic section 11 as a detection signal, whereby the logic is formed such that all the power MOSFETs Q1 through Q4 are turned off when the first NPN transistor 13a is turned on.

Due to this arrangement, even if the first grounding terminal GND1 becomes disconnected, the electric potential of the first grounding terminal GND1 floats only to a degree corresponding to the base-emitter voltage VBE (which is approximately 0.7 V) with respect to the second grounding terminal GND2, so that the normal operation of the functional block can be maintained, and all the control output terminals G1 through G4 are turned to the L-level by the control logic section 11, thereby making it possible to turn off the power MOSFETs Q1 through Q4.

In the normal condition, the base-emitter voltage VBE of the NPN transistors 13a and 13b is 0 V, so that their collectors both exhibit high impedance.

Next, when the second grounding terminal GND2 is opened, the second NPN transistor 13b is turned on, as in the case where the first grounding terminal GND1 is opened, making it possible to turn all the control output terminals G1 through G4 to the L-level.

When the grounding terminals GND1 and GND2 are simultaneously opened, the resulting condition is the same as that in the conventional circuit, and the control output terminals G1 through G4 are all turned to the H-level, allowing a through-current to flow to the power MOSFETs Q1 through Q4. When the first and second grounding terminals GND1 and GND2 are simultaneously opened, a defective soldering of the leads is to be assumed. However, it should be mentioned in this regard that there is little possibility of the first and second grounding terminals GND1 and GND2 being simultaneously opened due to a defective soldering of the leads.

Figure 2:
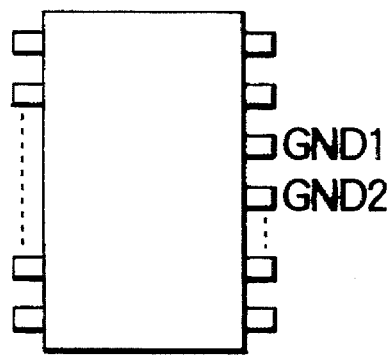
FIG. 2 is a diagram illustrating an undesirable arrangement of the first and second grounding terminal pins of FIG. 1.
Figure 3:
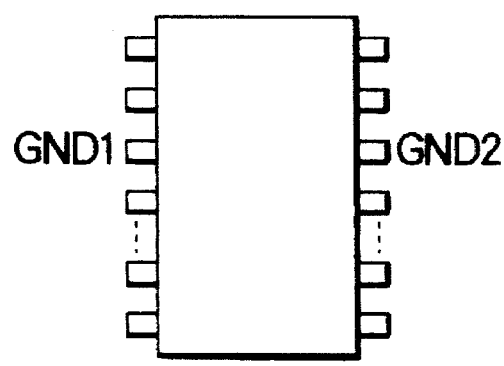
FIG. 3 is a diagram illustrating a desirable arrangement of the first and second grounding terminal pins of FIG. 1.

To reduce this possibility, it is desirable to avoid an arrangement of the first and second grounding terminals GND1 and GND2 as shown in FIG. 2, in which they are adjacent pins. They should be spaced apart as far from each other as possible by arranging them, for example, opposed to each other, as shown in FIG. 3.

However, after the assembly of the integrated circuit on the printed circuit board, the small signal system of the connector semiconductor integrated circuit of the printed circuit board is often separate from the grounding terminal of the power MOSFETs. In that case, only the grounding terminal for the semiconductor integrated circuit is a connector, so that there is a possibility of poor contact or terminal opening. If so, the resulting condition is the same as that in the conventional circuit. When, on the system side, the grounding terminal of a relay driver element of a main relay is connected to the grounding terminal of the semiconductor integrated circuit system of the connector of the printed circuit board, there is no fear of a large current flowing since the main relay is off even if the power MOSFET is turned on. That is, in many cases, a relay is provided between the power source and the drain of the power MOSFET on the high power side (high side) as a fail-safe means. When there is only one grounding terminal on the printed circuit board, no large current flows even when the grounding terminal becomes open since the grounding terminal of the power MOSFET is also open.

While the first embodiment has been described with reference to a case in which the external circuit consists of an H-bridge composed of power MOSFETs, the first embodiment is also applicable to half bridge, 3-phase full bridge and so on.

As described above, according to the first-embodiment, the grounding terminal is divided into first and second grounding terminals, which are connected to each other in the exterior, and a consumption current flows between the first and second grounding terminals GND1 and GND2 is detected. Further, due to the provision of the consumption current detecting section 13, which clamps the electric potential of the grounding terminals to a level not higher than the drive control potential of the power MOSFETs of the external circuit, no through-current is allowed to flow to the power MOSFETs of the external circuit, whereby they are protected from breakdown.

Further, as stated above, the consumption current detecting section 13 is composed of the first NPN transistor 13a, whose base is connected to the first grounding terminal GND1 and whose emitter is connected to the second grounding terminal GND2, and the second NPN transistor 13b, whose base is connected to the second grounding terminal GND2 and whose emitter is connected to the first grounding terminal GND1. With this arrangement, even when the first and second grounding terminals GND1 and GND2 are opened, the electric potential of the grounding terminals of the semiconductor integrated circuit is not raised to a level higher than the base-emitter voltage of the transistor, so that it is possible to clamp the electric potential to a level not higher than the drive control potential of the power MOSFETs of the external circuit, thereby preventing the power MOSFETs Q1 through Q4 from turning on and, at the same time, only the two transistors constitute the additional elements, making it possible to provide an inexpensive semiconductor integrated circuit which does not involve a substantial increase in chip size due to an increase in the number of elements.

Further, since the collector signals of the first and second NPN transistors 13a and 13b are supplied to the control logic section 11 as detection signals to OFF-control the power MOSFETs Q1 through Q4 of the external circuit, it is possible to OFF-control the above-mentioned drive control signals on the basis of the detection signals from the detecting section, thereby reliably preventing runaway of the power MOSFETs Q1 through Q4 of the external circuit to thereby secure safety.

Second Embodiment

Figure 4:
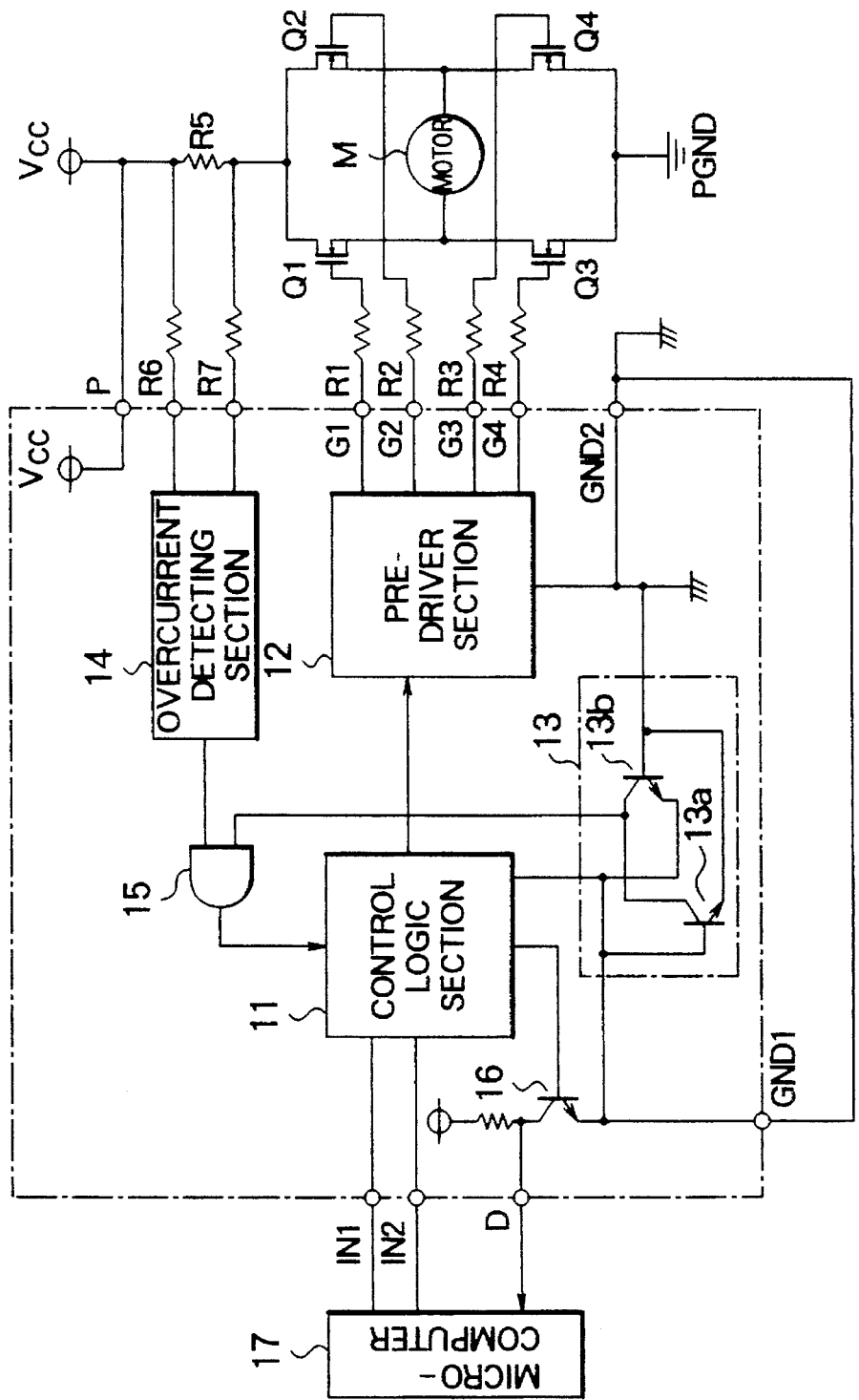
FIG. 4 is a block diagram showing a semiconductor integrated circuit according to a second embodiment of the present invention and a peripheral circuit thereof.

FIG. 4 is a block diagram showing a semiconductor integrated circuit according to the second embodiment of this invention, including a peripheral circuit.

In FIG. 4, the components which are the same as those of the first embodiment shown in FIG. 1 are indicated by the same reference numerals reference designators, and a description of such components will be omitted. In the second embodiment, numeral 14 indicates an overcurrent detecting section for detecting an overcurrent that is at a level not lower than a pre-set value flowing to the power MOSFETs Q1 through Q4; numeral 15 indicates an AND circuit which obtains the AND between the collector signals of the NPN transistors 13a and 13b of the consumption current detecting section 13 and the detection signal of the overcurrent detecting section 14, thereby supplying the output to the control logic section 11; numeral 16 indicates an NPN transistor which is base-drive-controlled on the basis of the output of the control logic section 11 to transmit an output from a self-diagnostic terminal D; and numeral 17 indicates a microcomputer which supplies a 2-bit operation command to input terminals IN1 and IN2 of the semiconductor integrated circuit to perform self-diagnostic on the basis of the output from the self-diagnostic terminal D when the grounding terminal GND1 or GND2 is open.

In contrast to the first embodiment shown in FIG. 1, in the second embodiment, not only are the control output terminals G1 through G4 turned to the L-level by the control logic section when the grounding terminal GND1 or GND2 is open, but a function is provided by which the external microcomputer 17 is informed of any abnormality, and, the overcurrent protection function, with which the semiconductor integrated circuit is intrinsically endowed, that is, the function by which a current flowing to a power MOSFETs Q1 through Q4 is monitored such that, when the current attains a level that is not lower than a pre-set value, the output is turned off, is utilized, whereby the signals of the NPN transistors 13a and 13b of the consumption current detecting section, which are turned on when the grounding terminal GND1 or GND2 is open, are used, thereby performing the same operation as that performed in detecting an overcurrent.

In the construction shown in FIG. 4, when a current that is at a level not lower than a pre-set value flows to the power MOSFETs Q1 through Q4, the output of the overcurrent detection section 14 is turned to L, and the AND circuit 15 is also turned to L, and, simultaneously with the turning OFF of the output terminals G1 through G4, the output of the self-diagnostic terminal D is inverted from that of the normal operation and turned from L to H. By connecting the collectors of the transistors 13a and 13b of the consumption current detecting section 13 to the AND circuit 15, the collector signals thereof are turned to L when the grounding terminal GND1 or GND2 is open, thereby realizing the above-described function. Only the two transistors, i.e., the NPN transistors 13a and 13b constitute the additional elements, and no substantial change in chip size is entailed, thereby realizing the semiconductor integrated circuit at low cost. Further, by transmitting an abnormal state signal indicating that either the grounding terminal GND1 or GND2 is open, self-diagnostic is made possible.

In the second embodiment described above, the control logic section 11 may have a logical construction such that, when either the GND1 or GND2 is open, the control output terminals G1 through G4 are not turned off, but only the self-diagnostic terminal D is inverted. Even when either the grounding terminal GND1 or GND2 is opened, the electric potential of the grounding terminal GND2 does not become higher than VBE (which is approximately 0.7 V) but is clamped to a level not higher than the drive control potential of the power MOSFETs Q1 through Q4, so that the power MOSFETs Q1 through Q4 are not turned on.

Thus, in accordance with the second embodiment, the control logic section 11 is constructed such that an abnormal state signal indicating that either the grounding terminal GND1 or GND2 is open is transmitted to the exterior, whereby self-diagnostic is made possible, and the semiconductor integrated circuit can be utilized in reliability evaluation.

Third Embodiment

Figure 5:
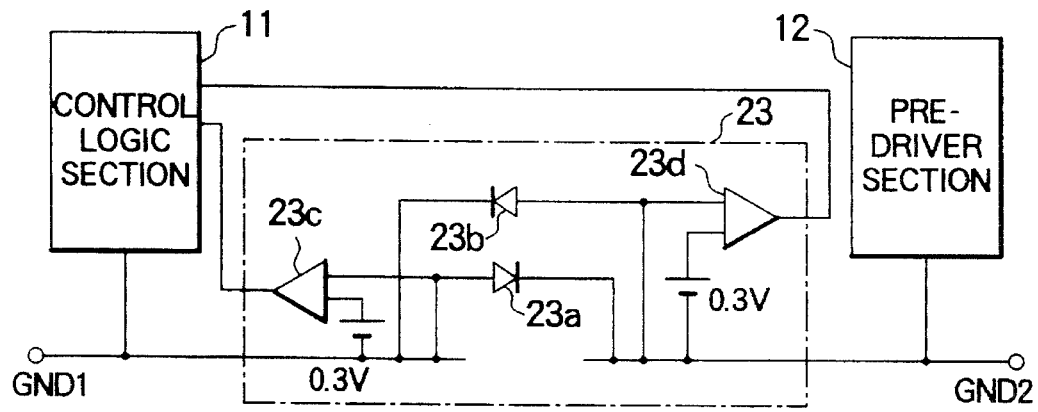
FIG. 5 is a block diagram mainly illustrating a detecting section of the semiconductor integrated circuit according to the second embodiment of the present invention.
Figure 6:
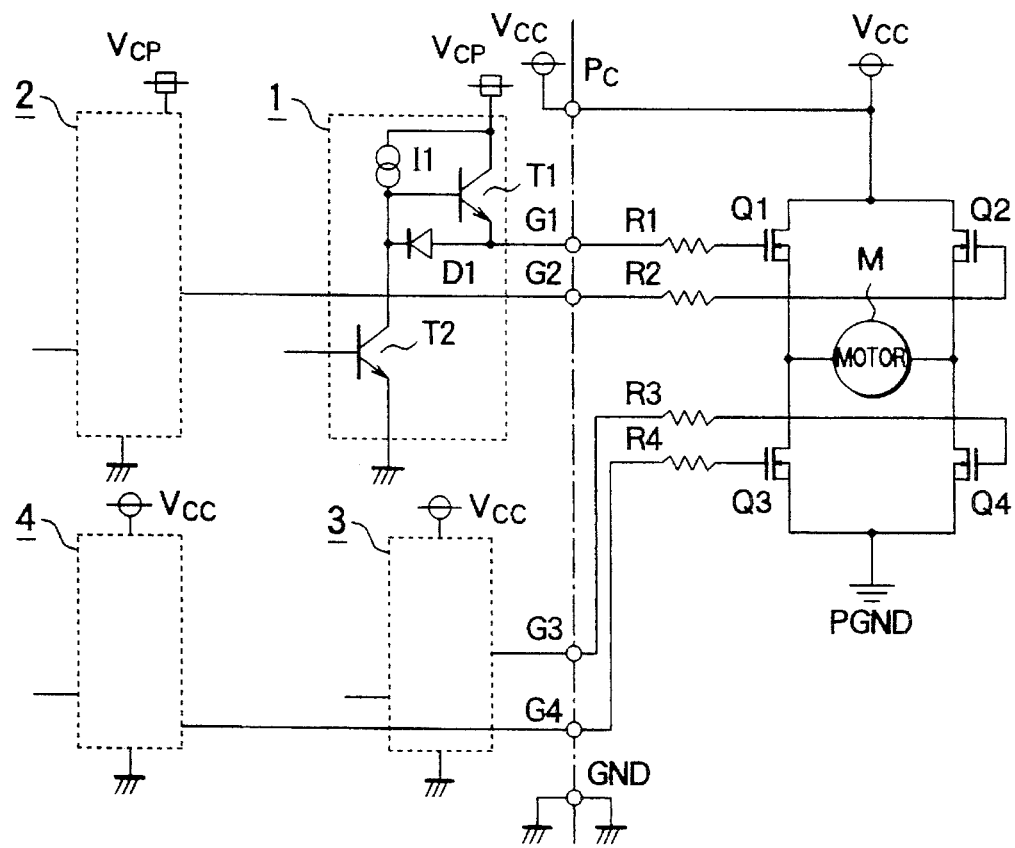
FIG. 6 is a block diagram showing a conventional semiconductor integrated circuit and a peripheral circuit thereof.
Figure 7:
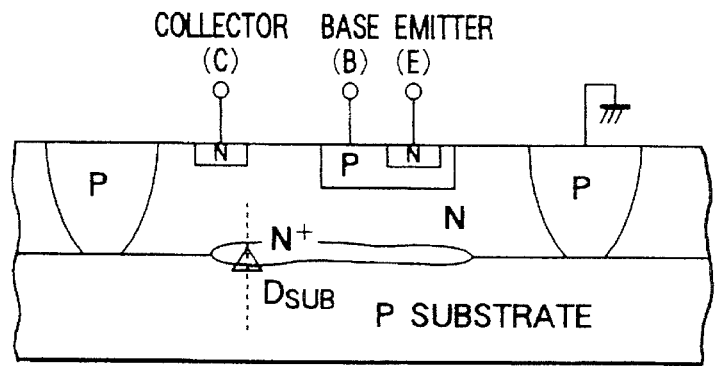
FIG. 7 is a sectional view showing the structure of an NPN transistor of a bi-polar semiconductor integrated circuit.
Figure 8:
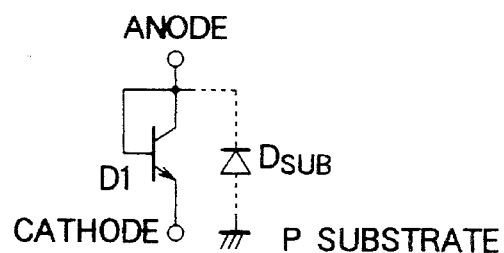
FIG. 8 is a diagram illustrating the relationship between a diode formed of an NPN transistor of a bi-polar semiconductor integrated circuit and a parasitic diode.
Figure 9:
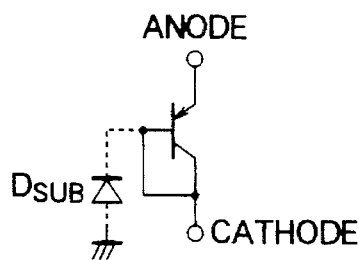
FIG. 9 is a diagram illustrating the relationship between a diode formed of a PNP transistor of a bi-polar semiconductor integrated circuit and a parasitic diode.

FIG. 5 is a block diagram showing a semiconductor integrated circuit according to the third embodiment of the present invention. The drawing mainly shows the construction of a consumption current detecting section 23, which corresponds to the consumption current detecting section 13 of the first embodiment, that is shown in FIG. 1.

As shown in FIG. 5, in the third embodiment, the consumption current detecting section 23, which detects a consumption current flow between the first and second grounding terminals GND1 and GND2 and which clamps the electric potential of the grounding terminals to a level that is not higher than the drive control potential of the power MOSFETs Q1 through Q4 of the external circuit, comprises a first diode 23a whose anode is connected to the first grounding terminal GND1 and whose cathode is connected to the second grounding terminal GND2, a second diode 23b whose cathode is connected to the first grounding terminal GND1 and whose anode is connected to the second grounding terminal GND2, a first comparator 23c which compares the forward voltage of the first diode 23a with a reference voltage, and a second comparator 23d which compares the forward voltage of the second diode 23b with a reference voltage. The comparison outputs of the first and second comparators 23c and 23d are supplied to the control logic section 11 as detection signals.

That is, the consumption current detecting section 23 of the third embodiment, shown in FIG. 5, uses the diodes 23a and 23b instead of the transistors 13a and 13b of the consumption current detecting section 13 of the first embodiment shown in FIG. 1. The anode side of each diode is connected to the comparison input side of the comparator so that the outputs of the comparators 23c and 23d may be inverted when either the grounding terminal GND1 or GND2 is opened. Due to this arrangement, even when the grounding terminal GND1 or GND2 is opened, the potential of the opened grounding terminal only undergoes floating to a degree corresponding to the forward voltage VF (approximately 0.7 V) of the diode and is not raised to a level near that of the power source Vcc, so that the normal operation is possible. As to the reference voltages of the comparators 23c and 23d, values that are somewhere between the level of the anode in the normal condition, which is 0 V, and that in the abnormal condition, which is 0.7 V, are selected. Thus, setting them at values ranging from 0.2 to 0.4 V, the same function as that of the first and second embodiments can be obtained.

Due to this construction of the consumption current detecting section 23, even if a difference in electric potential is generated between one and the other grounding terminals due to the influence of noises, etc. when none of the grounding terminal GND1 and GND2 is open, the influence of noises, etc. is removed by appropriately setting the values of the above reference voltages to thereby enhance the detection sensitivity, thereby preventing the power MOSFETs Q1 through Q4 of the external circuit from being erroneously operated. Further, it is possible to set the reference voltages of the comparators separately and independently, thereby making it possible to adjust the detection sensitivity.

While the above embodiments have been described as applied to the case in which the voltage-drive-type power control device consists of power MOSFETs, the present invention provides the same effect when applied to IGBT. Further, if the number of grounding terminals GND in the semiconductor integrated circuit is three or more, the same effect can be obtained as long as a construction similar to the one described above is adopted.

As described above, in accordance with this invention, the grounding terminal is divided into at least two grounding terminals, which are connected in the exterior, and there is provided a consumption current detecting section which detects a consumption current flow between one and the other grounding pins and which clamps the electric potential of the grounding terminal pins to a level not higher than the drive control potential of the voltage-driven-type power control devices of the external circuit, whereby no through-current is allowed to flow to the voltage-driven-type power control devices of the external circuit even when the grounding terminal pins are opened, and they are protected from breakdown.

Further, the above-mentioned consumption current detecting section comprises a first NPN transistor whose base is connected to the first grounding terminal and whose emitter is connected to the second grounding terminal, and a second NPN transistor whose base is connected to the second grounding terminal and whose emitter is connected to the first grounding terminal, wherein collector signals of the first and second NPN transistors are used as the detection signals, whereby it is possible to obtain, solely by the addition of two transistors, a semiconductor integrated circuit which allows no through-current to flow to the voltage-driven-type power control devices of the external circuit to thereby protect them from breakdown.

Further, the above-mentioned consumption current detecting section comprises a first diode whose anode is connected to the first grounding terminal and whose cathode is connected to the second grounding terminal, a second diode whose anode is connected to the second grounding terminal and whose cathode is connected to the first grounding terminal; a first comparator for comparing the forward voltage of the first diode with a reference voltage; and a second comparator for comparing the forward voltage of the second diode with a reference voltage, wherein the comparison outputs of the first and second comparators are output as detection signals. Due to this arrangement, if, when the grounding terminal pins are not open, a difference in electric potential is generated between the first and second grounding terminals due to the influence of noises or the like, the influence of such noises or the like can be removed by appropriately setting the above-mentioned reference voltages to thereby attain an enhancement in detection sensitivity, thereby preventing the voltage-driven-type power control devices from being erroneously operated. Further, the respective reference voltages of the comparators can be set separately and independently, thereby making it possible to adjust detection sensitivity.

Further, self-diagnostic is made possible by providing a control logic section which transmits to the exterior an abnormal state signal indicating that one of the first and second divisional grounding terminals is open on the basis of the detection signals of the consumption signal detecting section.

Further, by means of the above-mentioned control logic section, the drive control signals are OFF-controlled on the basis of the detection signals of the consumption signal detecting section, whereby it is possible to prevent a runaway of the voltage-driven-type power control devices of the external circuit and to thereby secure safety.

What is claimed is:

1. A semiconductor integrated circuit comprising:
   input terminals to which an operation command from the outside is input;
   a power terminal connected to a drive power source of voltage-driven-type power control devices constituting an object of control;
   control output terminals connected to control terminals of said voltage-driven-type power control devices and adapted to output drive control signals for drive-controlling said voltage-driven-type power control devices;
   a grounding terminal divided into at least two (first and second) grounding terminals connected to each other in the exterior;
   control means outputting a drive control signal corresponding to the operation command input through said input terminals to the control terminals of said voltage-driven-type power control devices through said control output terminals; and
   a consumption current detecting section detecting a flow of consumption current between the first and second grounding terminals and clamping the electric potential of said grounding terminal to a level not higher than the drive control potential of said voltage-driven-type power control devices.

2. The semiconductor integrated circuit according to claim 1 wherein said consumption current detecting section comprises a first NPN transistor whose base is connected to the first grounding terminal and whose emitter is connected to the second grounding terminal and a second NPN transistor whose base is connected to the second grounding terminal and whose emitter is connected to the first grounding terminal, and wherein collector signals of the first and second NPN transistors are output as detection signals.

3. The semiconductor integrated circuit according to claim 1 wherein said control means comprises a control logic section which outputs a control command corresponding to the operation command, input from the outside through said input terminals and consisting of bit information, and which causes a consumption current to flow to the first grounding terminal; and a pre-driver section which outputs a drive control signal to the control terminals of said voltage-driven-type power control devices which causes a consumption current to flow to the second grounding terminal.

4. The semiconductor integrated circuit according to claim 3 wherein said control logic section supplies said pre-driver section with a control command for OFF-controlling the drive control signals on the basis of the detection signals of the consumption current detecting section.

5. The semiconductor integrated circuit according to claim 1 wherein the pins of said first and second grounding terminals are arranged so as to be opposed to each other.

6. The semiconductor integrated circuit according to claim 3 wherein said pre-driver section outputs a drive control signal to the control terminals of said voltage-driven-power control devices constituting an H-bridge for reversible-operation control of a motor through said control output terminals.

7. The semiconductor integrated circuit according to claim 1 wherein said voltage-driven-power control devices are power MOSFETs.

8. The semiconductor integrated circuit according to claim 1 wherein said voltage-driven-power control devices are IGBTs.

9. The semiconductor integrated circuit according to claim 3 wherein said control logic section transmits to the exterior an abnormal state signal indicating that one of the first and second grounding terminals is open on the basis of the detection signals of said consumption signal detecting section, 10. The semiconductor integrated circuit according to claim 9 further comprising: a self-diagnostic terminal that transmits a self-diagnostic output; an overcurrent detecting section that detects an overcurrent that is at a level not lower than a pre-set value flowing to said voltage-driven-type power control devices; an AND circuit that outputs the AND between the detection signals of said consumption current detecting section and the detection signal of said overcurrent detecting section to said control logic section; and a transistor that is base-drive-controlled on the basis of the abnormal state signal transmitted from said control logic section on the basis of the output of said AND circuit to transmit a collector signal from said self-diagnostic terminal as a self-diagnostic signal.

11. The semiconductor integrated circuit according to claim 1 wherein said consumption current detecting section comprises: a first diode whose anode is connected to said first grounding terminal and whose cathode is connected to said second grounding terminal; a second diode whose anode is connected to said second grounding terminal and whose cathode is connected to said first grounding terminal; a first comparator that compares the forward voltage of said first diode with a reference voltage; and a second comparator that compares the forward voltage of said second diode with a reference voltage, wherein the comparison outputs of said first and second comparators are output as detection signals.

* * * * *